United States Patent [19]

Harrelson, Jr.

[11] 4,092,203

[45] May 30, 1978

[54] APPARATUS FOR USE IN TIRE RETREADING

[75] Inventor: Albert A. Harrelson, Jr., Asheboro, N.C.

[73] Assignee: Harrelson Rubber Company, Asheboro, N.C.

[21] Appl. No.: 669,937

[22] Filed: Mar. 24, 1976

[51] Int. Cl.$^2$ ............................................. B29H 17/36

[52] U.S. Cl. ..................................... 156/394; 156/96; 156/129

[58] Field of Search ............ 156/95, 96, 116, 126–129, 156/394 R, 394 FM; 425/14, 15, 16, 17, 18, 22; 150/54 B

[56] References Cited

U.S. PATENT DOCUMENTS

| 2,014,010 | 9/1935 | Wheatley | 156/96 |
|---|---|---|---|
| 2,746,515 | 5/1956 | Usack | 156/96 |
| 2,774,409 | 12/1956 | Skidmore | 156/96 |
| 3,236,709 | 2/1966 | Carver | 156/96 |
| 3,779,832 | 12/1973 | Reppel | 156/96 |
| 3,802,977 | 4/1974 | Wasko | 156/96 |
| 3,846,201 | 11/1974 | Huskins | 156/96 |
| 3,884,740 | 5/1975 | Schelkmann | 156/96 |
| 3,966,535 | 6/1976 | Abularach | 156/96 |

*Primary Examiner*—William A. Powell
*Assistant Examiner*—John E. Kittle
*Attorney, Agent, or Firm*—Joseph H. Heard

[57] ABSTRACT

The apparatus is used for tire-retreading of the type wherein a flexible impervious covering encloses a replacement tread strip encircling the tire and is subjected to a pressure-differential so as to maintain firm engagement between the strip and the tire during bonding of the former to the latter within a heated pressure chamber. The apparatus includes at least one such cover or shroud member whose marginal edge portions overlie opposite sidewalls of the tire and are maintained in fluid-tight, sealed relationship therewith by first and second disc-like members which overlie respective ones of the envelope edge portions and the tire sidewalls and which are urged toward each other by releasable clamping means innerconnecting their radially-innermost portions and extending generally axially through the rim-mounted tire. The replacement tread strip may be formed either of precured rubber or of rubber which is cured during the retreading operation, and the tire may be either of a pneumatic type or a solid type. When the tire undergoing retreading is of the solid type, the apparatus may include a second impervious cover or shroud member which encloses the tire-mounting rim and its junctures with the tire-bead areas, and whose marginal edge portions overlie the tire sidewalls and are maintained in fluid-tight, sealed relationship therewith by the same disc-like members and associated clamping means employed in association with the first shroud member.

5 Claims, 7 Drawing Figures

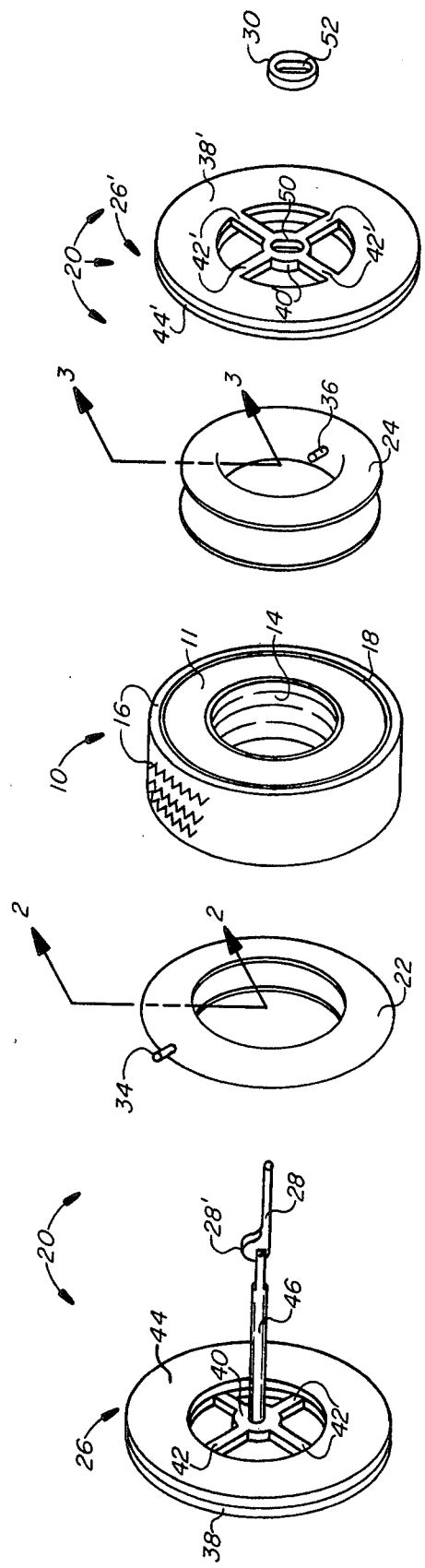
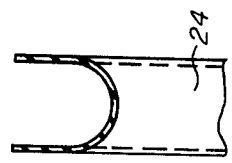
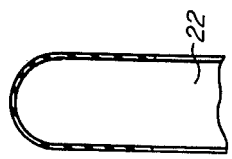
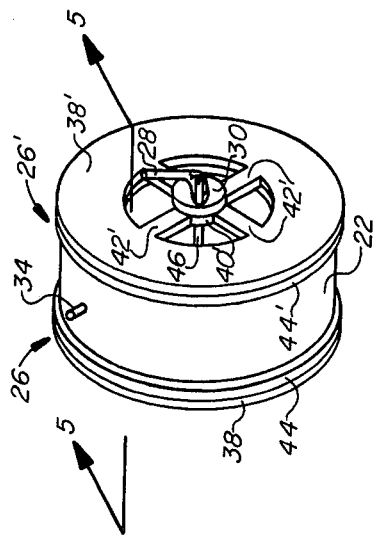

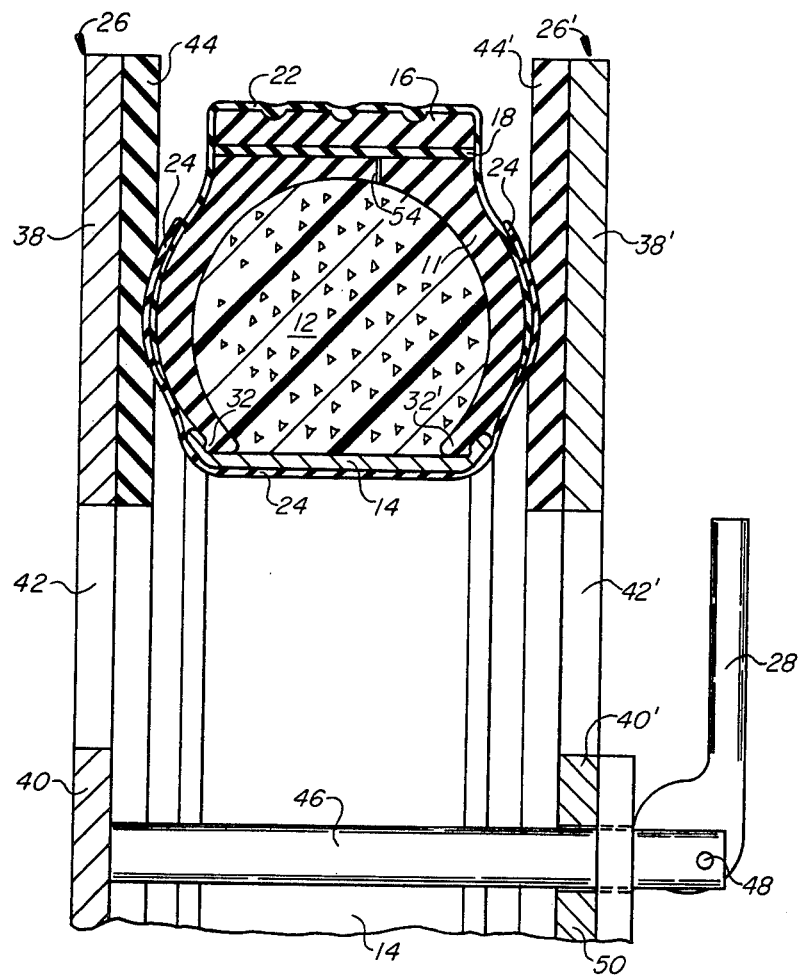
FIG. 5
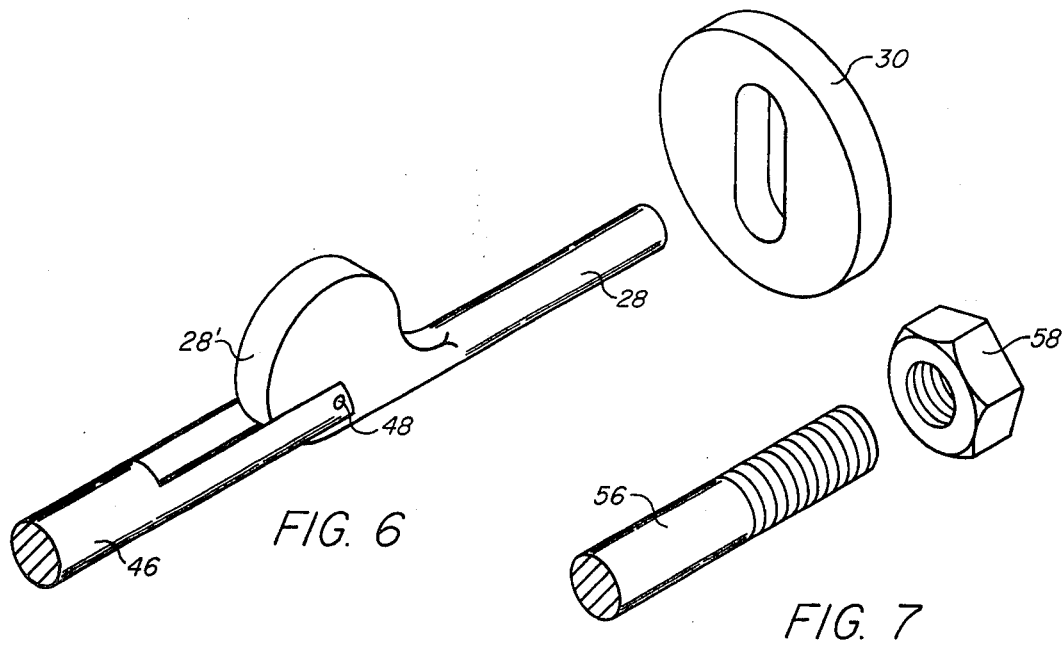
FIG. 6
FIG. 7

APPARATUS FOR USE IN TIRE RETREADING

BACKGROUND OF THE INVENTION

This invention relates to tire-retreading apparatus, and more specifically relates to improved apparatus for use in tire-retreading operations of the type wherein flexible impervious means overlies and encloses a replacement tread strip encircling the tire to be retreaded and is subjected to a pressure differential so as to press the strip toward the tire during bonding of the former to the latter within a heated pressure chamber.

Prior U.S. patents disclosing methods and/or apparatuses for use in association with retreading operations of the aforesaid general type include U.S. Pat. Nos. 3,895,985, 3,884,740, 3,846,201, 3,802,978, 3,793,116, 3,769,121, 3,730,801, 3,325,326, 3,236,709, 3,976,910 and 2,966,936.

In keeping with past industry practices, much tire-retreading of the general type described above is done in relatively small retreading shops. Such shops, although called upon to perform their services in association with tires of many different sizes and constructions, customarily can afford to own only a limited quantity of retreading equipment and to employ only semi-skilled personnel. Apparatus intended for tire-retreading operations of the subject type should therefore be suitable for use in association with tires of many different sizes, constructions and mountings. In the latter connection, the apparatus desirably should be capable of use in connection with not only pneumatic tires, but also in connection with "solid" tires which are filled with foamed elastomeric material, irrespective of whether any particular tire is mounted upon the customer's vehicle rim (as would always be the case with a solid tire) or requires mounting upon a rim before retreading (as might or might not be the situation in the case of a pneumatic tire). The construction of the apparatus should also be highly economical, rugged and durable, but at the same time relatively simple both from the viewpoint of the number of components incorporated therein, which number should be minimal, and from the viewpoint of the nature of the cooperation between such components during use of the apparatus. That is, the apparatus should be readily usable by even personnel possessing only modest skills, in a proper manner consistently producing the desired results, and should be so constructed as to counteract insofar as possible the tendency of some such personnel to lose or damage apparatus-components.

SUMMARY OF THE INVENTION

The present invention provides an improved apparatus, for use in association with tire-retreading operations of the previously-indicated type, which possesses the aforesaid desirable attributes. The apparatus is of economical, rugged and durable construction, is comprised of a minimal number of relatively simple components, and is therefore relatively inexpensive from the viewpoint of both its initial acquisition-cost and its maintenance-cost. Additionally, the apparatus may be successfully and easily used, even by personnel possessing only limited skill or training, for the retreading of tires of widely-varying sizes and irrespective of whether such tires are of the pneumatic or solid types and are or are not mounted upon the customer's vehicle rim.

The apparatus generally includes at least one flexible impervious cover or shroud member, of overall annular shape and generally U-shaped cross-sectional configuration, whose central portion encircles and encloses the replacement tread strip to be bonded upon the outer circumference of the tire undergoing retreading. The marginal edge portions of the shroud member overlie opposite sidewalls of the tire and are maintained during use of the apparatus in directly-abutting, fluid-tight, sealed relationship with such sidewalls by first and second disc-like members which overlie respective ones of the shroud edge portions and the tire sidewalls, and which during use of the apparatus are urged toward each other and the tire therebetween by releasable clamping means innerconnecting the radially-innermost portions of such disc-like members. The aforesaid clamping means includes an elongate rigid member which is secured adjacent one end to the innermost portion of the first disc-like member and which during use of the apparatus projects therefrom, in generally co-axial relationship to the tire undergoing retreading, through an opening provided within the innermost portion of the second disc member. In its preferred construction the clamping means further includes a cam-lever pivotally secured to the opposite end of such elongate member for pivotal movement from a first or "released" position to a second or "engaged" position wherein the cam means thereon urges the disc members toward each other.

The disc members of the apparatus preferably have a large diameter which permits their utilization in association with tires of widely varying sizes and constructions, and which also may facilitate placement of the assembled tire and apparatus components within the heated pressure chamber wherein final bonding of the retread strip to the tire is achieved. Those surfaces of the disc members which confront the sidewalls of a tire undergoing retreading preferably are provided with layers of resilient padding material thereon. Such padding material assists realization of the desired fluid-tight sealed relationship between the marginal edge portions of the shroud member and the adjacent tire sidewalls even when, as may sometimes be the case, such sidewalls possess somewhat irregular contours due, for instance, to the presence of molded indicia thereon.

When used in association with the retreading of solid tires, the apparatus may further include a second flexible, impervious shroud member whose central portion overlies and encloses the rim upon which such tire is mounted and the junctures between such rim and the tire beads, and whose marginal edge portions also overlie the tire sidewalls and are maintained in fluid-tight sealed relationship therewith by the same disc members previously discussed. Such second shroud member, when employed, guards against the possibility of failure of the retreading operation due to leakage into the interior of the tire of the pressurized air, steam or other fluid introduced into the heated pressure chamber during final bonding of the retread strip to the tire.

DESCRIPTION OF THE DRAWINGS

Other features of the invention will be apparent from the following description of illustrative embodiments thereof, which should be read in conjunction with the accompanying drawings, in which:

FIG. 1 is an exploded perspective view of tire retreading apparatus in accordance with the invention, and of a tire assembly in association with the retreading of which the apparatus is usable;

FIG. 2 is an enlarged fragmentary sectional view, taken approximately along the line 2—2 of FIG. 1, through a first shroud member of the apparatus;

FIG. 3 is an enlarged vertical sectional view, taken substantially along the line 3—3 of FIG. 1, through a second shroud member of the apparatus;

FIG. 4 is a perspective view of the apparatus assembled in association with the tire assembly of FIG. 1;

FIG. 5 is an enlarged fragmentary sectional view, taken substantially along the line 5—5 of FIG. 4, through the apparatus-tire assembly of FIG. 4;

FIG. 5 is an enlarged fragmentary perspective view of the clamping means of the apparatus shown in FIGS. 1, 4 and 5; and FIG. 7 is an enlarged fragmentary perspective view of another embodiment of the clamping means usable in the apparatus.

DESCRIPTION OF THE ILLUSTRATED EMBODIMENTS

In FIG. 1 of the drawings the numeral 10 designates a used-tire assembly including a solid-type truck tire 11, filled with foamed elastomeric material 12 and mounted upon an open-center truck rim 14, which has been partially prepared for pressure-chamber retreading. As a result of the aforesaid preparation, assembly 10 further includes a replacement tread strip 16, illustratively of the type formed of precured rubber and having a thread design molded into its outer surface, which encircles the peripheral surface of tire 11 and is adhesively secured thereto (see also FIG. 5) by an intervening layer of "cushion gum" binder material 18 comprised of a suitable uncured-rubber composition. As is well known to those skilled in the art, a permanent bond is adapted to be effected between tread strip 16 and tire 10 through curing of the binder material 18 in situ therebetween within a heated pressure chamber (not shown) into which assembly 11 is placed following affixation thereto of suitable apparatus for, during the curing operation and among other possible things, maintaining a radially-inwardly directed compressive force upon thread strip 16.

The illustrated apparatus employed pursuant to the present invention for the aforesaid purpose is designated in its entirety in FIG. 1 by the numeral 20. Such apparatus generally includes flexible impervious cover or shroud means, illustratively in the form of outer and inner shroud members 22, 24, respectively; first and second disc-like members 26,26', respectively; and releasable clamping means including, in its prefered form shown in FIGS. 1 and 4-6, a cam-lever 28. The clamping means may further include, in certain utilizations of apparatus 20, spacer means in the form of one or more spacer members such as that designated by the numeral 30.

Shroud members 22,24 are each annular in form, have a substantially U-shaped cross sectional configuration, and may be formed from sections of rubber inner-tubes or fabricated independently from similar flexible impervious rubber or other sheet material which is not adversely affected by heat. When outer shroud member 22 is fitted upon tire 11 (see also FIGS. 4 and 5), the central portion of the shroud member encircles and encloses the tread strip 16 upon such tire, and the marginal edge portions of shroud member 22 extend in overlying adjacent relationship to respective opposite sidewalls of tire 11. The length (i.e., radial dimension) of the marginal edge portions of shroud member 22 is such that they extend radially inwardly at least to, and preferably somewhat beyond, the sidewall "crown" areas between which tire 11 possesses its maximum width. The central portion of inner shroud member 24 encircles and encloses the rim 14 upon which tire 11 is mounted, together with the junctures between such rim and the tire beads 32,32'. The marginal edge portions of inner shroud member 24 overlie opposite sidewalls of tire 11 and the previously-discussed marginal edge portions of the outer shroud member 22 thereon. The length of the marginal edge portions of inner shroud member 24 is such that the same extend radially outwardly at least to, and preferably somewhat beyond, the sidewalls of tire 11. Valve members 34,36 are provided upon the central portions of shroud members 22,24, respectively, for venting purposes to be subsequently discussed.

Disc member 26 is of generally wheel-like shape, including radially outermost and innermost sections 38,40, respectively, which are rigidly innerconnected by a plurality of radially-extending spoke-like sections 42. All of the foregoing sections of member 26 are formed of metal. A layer of resilient padding material 44, of heat-resistant rubberous or textile composition, may be and preferably and illustratively is bonded or otherwise suitably secured upon one radial face of annular outer section 38 of disc member 26. The second disc member 26' includes the same components, which are identified in the drawings by the same reference numerals with the addition of a prime designation, as thus-far described in connection with the first-mentioned disc member 26. The diameters of disc members 26,26' are the same, and preferably and illustratively are greater than the diameter of the assembly 10.

An elongate rod-like member 46 is welded or otherwise rigidly secured adjacent one of its ends to the center of the inner or hub-like section 40 of disc member 26, and projects axially therefrom. The opposite end of rod member 46 is bifurcated (see also FIG. 6) and lever 28 is pivotally secured thereto, as by means of a pivot pin 48, for pivotal movement between a first position, shown in FIGS. 1 and 6 and wherein the lever extends generally axially of rod member 46, and a second position such as shown in FIGS. 4 and 5 wherein lever 28 extends angularly relative to rod member 44. The inner section 40' of the second disc member 26' is provided with a slot-like opening 50 therein which is of sufficient size to permit passage of lever 28 therethrough when such lever is in its aforesaid first position and aligned with opening 50. A similarly-shaped opening 52 is provided within the illustrated spacer member 30, and in any additional spacer members which might be employed during use of apparatus 20.

During use of apparatus 20, shroud members 22,24 are first placed upon the tire assembly 10 in the manner previously described. Disc members 26,26' are then placed adjacent opposite sides of tire 11, in concentric relationship with it and each other and with padding material 44,44' upon their outer sections 38,38' confronting respective ones of the tire sidewalls and the edge portions of the shroud members 22,24 which overlie such sidewalls. Rod member 46 projects coaxially of and through the center opening of assembly 10 and its bifurcated free end projects through the slot-like opening 50 of inner portion 40' of disc member 26', as well as through the similar opening 52 within spacer member 30 (assuming that, as is illustratively the case, such spacer member is employed).

Lever 28, which during its passage with rod member 46 through the aligned openings 50, 52 occupied its first position of FIGS. 1 and 6, then has its pivoted inner end portion disposed in closely-spaced relationship to the exterior (right-most, as viewed in the drawings) face of spacer member 30. Disc member 26' and spacer member 30, or at least the right-most one of such components (i.e., disc member 30, in the illustrated arrangement), are now rotated approximately ninty degrees about the axis of rod member 46 so as angularly displace the major axes of openings 50,52 relative to the plane of pivotal movement of lever member 28. Lever 30 is then pivoted about the axis of pin 48 from its first position of FIGS. 1 and 6 to its angular second position such as illustrated in FIGS. 4 and 5. Due to the engagement which then transpires between the exterior face of spacer member 30 and the cam surface 28' upon lever 28, the aforesaid pivotal movement of lever 28 to its spaced position forces disc members 26,26' toward each other and thus against the edge portions of the shroud members 22,24 and the opposite sidewalls of the tire 11 overlaid thereby. The forces thus imposed upon the marginal edge portions of shroud members 22,24 — through lever 28, rod member 46, disc members 26,26' and padding 44,44' — create fluid-tight, sealed relationships between the marginal edge portions of members 22,24 and the sidewalls of tire 11 overlaid thereby. Such sealed relationships are maintained for so long as lever 28 occupies its second position (FIGS. 4 and 5), which the lever will automatically remain in until again manually returned to its first position. The presence of the padding material 44,44' upon disc members 26,26' assists in insuring realization of the aforesaid fluid-tight sealed relationships notwithstanding the possible presence of significant surface irregularities upon the sidewalls of the tire undergoing retreading. When the sidewalls of the tires with which apparatus 20 is to be used do not contain surface irregularities of significant size, however, padding material 44,44' need not be employed and disc members 26,26' might instead be unpadded.

After apparatus 20 is secured to tire assembly 11, which takes only a brief period of time, the resulting apparatus-tire assembly shown in FIGS. 4 and 5 is placed within a pressure chamber (not shown) such as is conventionally employed in tire-retreading operations of the present type. Following the connection to shroud-member valves 34,36 of vent conduits (not shown) leading from the aforesaid chamber and to the ambient atmosphere, heated pressurized fluid such as air or steam is introduced into the chamber, in a manner well known to those skilled in the art. The pressure-differential thus created upon outer shroud member 22 thus causes the same to firmly press tread strip 16 against cushion gum binder material 18 as the latter is cured by the heat of the pressurized fluid within the chamber. At the same time, the presence of inner shroud member 24 prevents the possibility of the heated air, steam or other chamber-fluid being introduced into the interior of tire 10 through any crevice, passage or opening which might be present in rim 14 or in its junctures with beads 32,32' of tire 11. Such crevices, passages or openings should not exist, but may on occasion be created during use of a solid tire such as the tire 11. If the heated steam, air or other chamber-fluid should enter the interior of tire 11, the retreading operation likely would prove unsuccessful. This is because such fluid could then pass from the tire's interior through the vent openings 54 (one of which is shown in FIG. 5) customarily provided within its periphery for gasventing purposes at the time elastomeric material 12 is introduced therein, and the passage of chamber-fluid from vent openings 54 would prevent a satisfactory bond from being obtained between binder material 18 and the outer periphery of tire 11. The presence of inner shroud member 24 negates the possibility of such undesirable result.

When the added protection afforded thereby in the retreading of a solid tire is not deemed necessary or desirable, inner shroud member 24 need not be employed, and such member would normally not be employed when the tire undergoing retreading if of a pneumatic type, which would not possess any vent openings 54, rather than a solid type. When inner shroud member 40 is not employed, the padding material 44,44' upon disc members 26,26' would directly engage the outer surfaces of the respective adjacent ones of the marginal edge portions of outer shroud member 22. Apparatus 20 may be used with equal facility in association with the retreading of a pneumatic tire which is mounted upon the customer's vehicle rim, or in association with a pneumatic tire which as received by the retreader is not mounted upon a rim. In the latter case, the retreader simply mounts the tire upon a rim prior to proceeding with the retreading process.

The relatively large diameter of disc members 26,26' is desirable since, among other possible advantages, it facilitates use of apparatus 20 in association with tires of varying sizes and shapes. Thus, as is most clearly apparent from FIG. 5, apparatus 20 could be employed with equal facility in association with tires of considerably smaller diameter than that of the illustrated truck tire 11, and/or in association with tires whose sidewall "crown" portions are disposed at different radial distances from their central axes. Additionally, once apparatus 20 is secured to a tire assembly 10 in the manner shown in FIGS. 4 and 5, it will be apparent that the projecting peripheral edges of disc members 26,26' might be employed to support the resulting apparatus-tire assembly as it is transported to the pressure chamber (not shown) and also during the time of its treatment within such chamber. That is, the apparatus-tire assembly of FIGS. 4 and 5 might be stood in upright fashion upon the floor of the chamber, since the outer surface of shroud member 22 would then still be spaced from such floor due to the projection of disc members 26,26' radially therebeyond, rather than having to be suspended within the chamber by means of a rack or the like.

Spacer member 30 would of course not be employed if the width of a particular tire were sufficiently greater than the width of the illustrated tire 11 as to not require its use. Additional and/or thicker spacer members, of the same general type as member 30, would be employed during use of apparatus 20 in association with tires of significantly lesser width than the illustrated tire 11.

The use of disc members 26,26' which are of a partially "open" construction, i.e., which incorporate spoke-like interconnecting sections 42,42', is desirable since such construction minimizes the overall weight of apparatus 20 and also permits convenient access to and inspection of the space between disc members 26,26' subsequent to their affixation to tire assembly 11.

The previously-described clamping means employing cam-lever 28 contributes significantly to the ease and speed of utilization of apparatus 20, and to its durability, even when employed by retreading personnel possessing only modest skills. However, if such benefits are not desired, clamping means of the alternative construction shown in FIG. 7 may be employed. The clamping means shown in FIG. 7 includes an elongate rod-like member 56 corresponding in placement and construction to the rod member 46 previously discussed except for the fact that its free end is not bifurcated, and instead is threaded so as to releasably receive thereon a cooperating nut 58 of relatively large diameter. When the clamping means of FIG. 7 is employed, the various other components of the apparatus are first placed in association with tire assembly 11 in the manner previously described, and nut 58 is then threaded upon the free end portion of rod member 56 and tightened to force disc members 26,26' toward each other end thus create the desired fluid-tight, sealed relationships between the marginal edge portions of the shroud means and the tire sidewalls overlaid thereby.

In lieu of using a tread strip 16 formed by precured rubber, as previously described, the tread strip placed about the outer periphery of the tire to be retreaded might instead be formed of uncured rubber. In such case the use of the layer of binder material 18 might not be required, and in any event that uncured tread strip would itself undergo curing during treatment of the apparatus-tire assembly within the heated pressure chamber (not shown).

While specific embodiments of the invention have been shown and described, this was for purposes of illustration only, and not for purposes of limitation, the scope of the invention being in accordance with the following claims.

That which is claimed is:

1. Tire retreading apparatus for use in association with a tire assembly including a rim-mounted tire having thereon a replacement tread strip to be permanently bonded to the tire within a heated pressure chamber, comprising:

a first flexible impervious shroud member having a central portion extending in overlying encircling relationship to the tread strip upon the tire, and having opposite marginal edge portions extending in overlying adjacent relationship to respective opposite sidewalls of the tire;

first venting means upon said central portion of said shroud member for venting air entrapped between said shroud member and said tread strip encircled thereby;

a second flexible impervious shroud member having a central portion extending in overlying encircling relationship to the tire-mounting rim and to the juncture thereof with the beads of the tire of the assembly, said second shroud member having opposite marginal edge portions extending in overlying adjacent relationship to respective opposite sidewalls of the tire and in contigious relationship to opposite ones of said marginal edge portions of said first-mentioned shroud member;

first and second disc-like members disposed in laterally spaced and substantially parallel relationship to each other adjacent opposite sidewalls of the tire for movement toward and away from each other, movement of said disc-like members toward each other being opposed only by the presence therebetween of the tire assembly; each of said disc-like members including a radially-outermost annular section, a radially-innermost section, and a plurality of circumferentially-spaced spoke-like sections extending generally radially between and rigidly interconnecting said outermost and innermost sections, the areas between said sections of each of said disc-like members being open; said disc-like members extending in substantially co-axial relationship to each other and to the tire and said radially-outermost sections thereof overlying respective ones of said marginal edge portions of said first and second shroud members and respective ones of the tire sidewalls overlaid by said edge portions of said shroud members;

second venting means upon said central portion of said second shroud member, said second venting means being accessible through said open areas of said disc-like members, for venting air entrapped between said second shroud member and the components of said assembly encircled thereby;

and releasable clamping means extending generally axially through the tire assembly and interconnecting said disc-like members for so forcing said disc-like members toward each other as to create fluid-tight, sealed relationships between said marginal edge portions of said shroud members and the respective ones of the tire sidewalls overlaid thereby; said sealed relationships being created by laterally-directed compressive forces imposed by said outermost sections of said disc-like members upon respective ones of said marginal edge portions of said shroud members and being effective to prohibit passage, during heating of said assembly within said pressure chamber, of air or other fluid between said marginal edge portions of said shroud members and the respective ones of the tire sidewalls overlaid thereby.

2. Apparatus as in claim 1, wherein each of said disc-like members has a layer of resilient material affixed to that surface thereof confronting the adjacent one of the sidewalls of the tire overlaid thereby.

3. Apparatus as in claim 2, wherein said disc-like members have an outer diameter greater than the diameter of the tire assembly.

4. Apparatus as in claim 3, wherein said clamping means includes an elongate rod-like member extending in substantially concentric relationship to the tire assembly between said innermost sections of said disc-like members.

5. Apparatus as in claim 3, wherein said innermost section of one of said disc-like members has a central opening therein, and said clamping means includes an elongate rigid member connected adjacent one end portion to said innermost section of the other of said disc-like members and projecting generally axially therefrom through said opening within said one of said disc-like members, lever means connected to the other end portion of said elongate member for pivotal movement relative thereto between first and second pivotal positions, and cam means upon said lever means for forcing said disc-like members toward each other in response to pivotal movement of said lever means from said first and to said second of said pivotal positions thereof.

* * * * *